United States Patent
Graefe

(10) Patent No.: US 8,768,938 B2
(45) Date of Patent: Jul. 1, 2014

(54) HISTOGRAM PROCESSING BY TREND AND PATTERN REMOVAL

(75) Inventor: Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 12/491,965

(22) Filed: Jun. 25, 2009

(65) Prior Publication Data

US 2010/0332494 A1  Dec. 30, 2010

(51) Int. Cl.
G06F 17/30 (2006.01)
G06F 7/00 (2006.01)

(52) U.S. Cl.
USPC ........... 707/754; 707/713; 707/722; 707/737; 707/769; 707/803

(58) Field of Classification Search
None
See application file for complete search history.

(56) References Cited

U.S. PATENT DOCUMENTS

| | | | | |
|---|---|---|---|---|
| 6,012,054 A * | 1/2000 | Seputis | ............ | 702/180 |
| 6,334,095 B1 * | 12/2001 | Smith | ............ | 702/181 |
| 6,460,045 B1 * | 10/2002 | Aboulnaga et al. | ............ | 1/1 |
| 6,477,523 B1 * | 11/2002 | Chiang | ............ | 1/1 |
| 7,062,393 B2 * | 6/2006 | Laquai | ............ | 702/69 |
| 7,174,041 B2 | 2/2007 | Shima | | |
| 7,219,034 B2 * | 5/2007 | McGee et al. | ............ | 702/180 |
| 7,480,640 B1 * | 1/2009 | Elad et al. | ............ | 706/14 |
| 7,834,907 B2 * | 11/2010 | Kawai | ............ | 348/208.4 |
| 7,877,374 B2 * | 1/2011 | Zabback et al. | ............ | 707/713 |
| 7,933,932 B2 * | 4/2011 | Singh | ............ | 707/803 |
| 2003/0095178 A1 | 5/2003 | Shibayama | | |
| 2003/0202694 A1 * | 10/2003 | Shima | ............ | 382/173 |
| 2005/0102259 A1 * | 5/2005 | Kapur | ............ | 707/1 |
| 2005/0192943 A1 * | 9/2005 | Siddiqui et al. | ............ | 707/3 |
| 2008/0133458 A1 * | 6/2008 | Zabback et al. | ............ | 707/2 |
| 2009/0136130 A1 * | 5/2009 | Piper | ............ | 382/170 |

* cited by examiner

*Primary Examiner* — Jung Kim
*Assistant Examiner* — James J Wilcox

(57) ABSTRACT

A data processing system compress a histogram with less information loss than simply reducing the number of steps (or intervals) in the histogram. The data processing system uses a very detailed histogram as a starting point and comprises histogram compression logic that compresses a detailed histogram by detecting trends and periodic patterns in the detailed histogram. The histogram compression logic extracts the detected trends and periodic patterns from the detailed histogram, and forms a compressed histogram as a distribution of data remaining after extraction of the trends and periodic patterns.

15 Claims, 12 Drawing Sheets

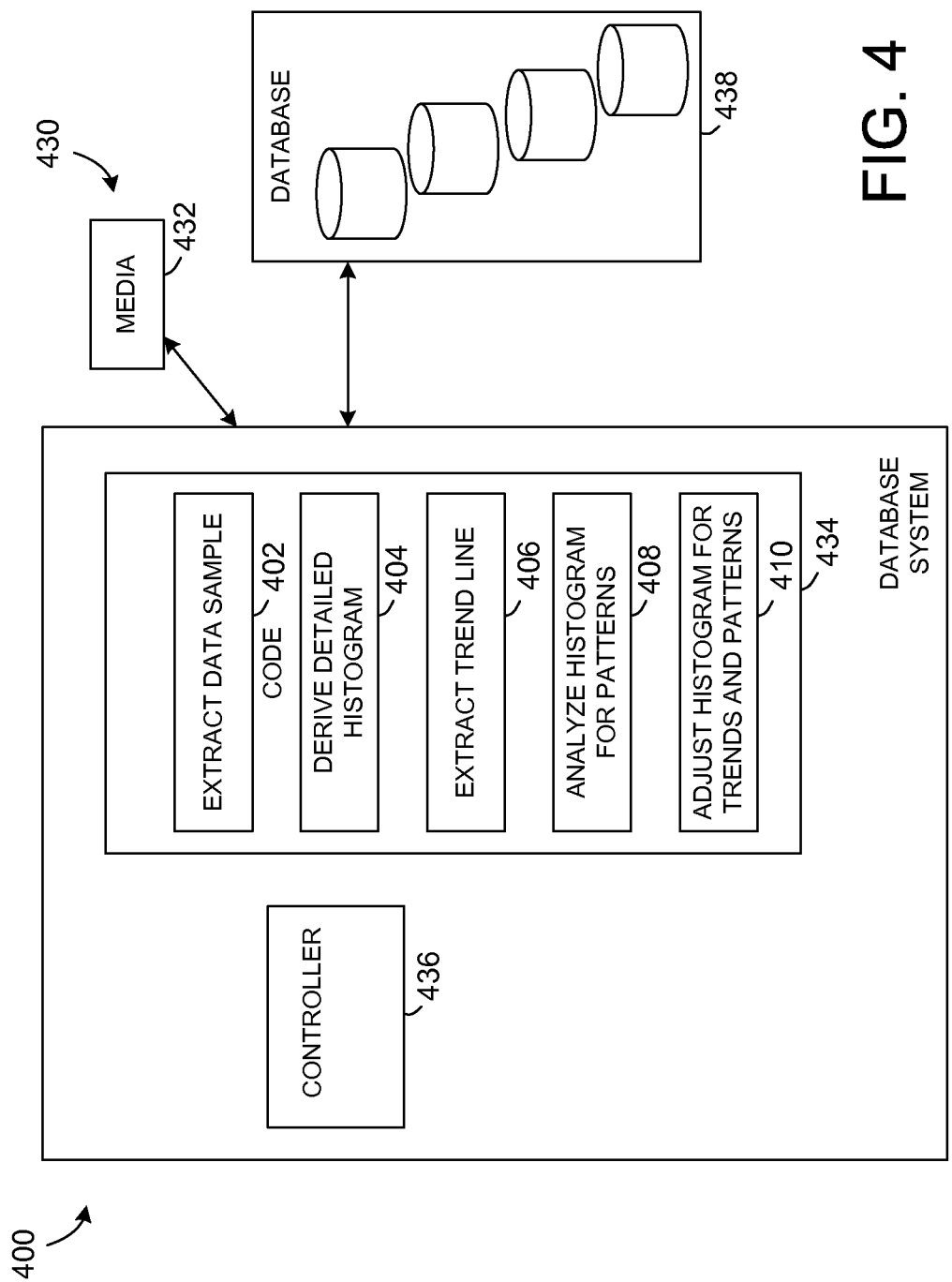

HISTOGRAM PROCESSING BY TREND AND PATTERN REMOVAL

BACKGROUND

Histograms can be used for selectivity estimation during database query optimization in data processing applications. Histogram compression into fewer intervals enables faster histogram processing and thus faster query optimization but at the cost of reduced accuracy. Trends (for example ever-increasing monthly sales) make histograms inherently inaccurate. In conventional system, the inaccuracy can be reduced only by increasing the number of intervals. Periodic patterns (for example, weekly sales spiking on Friday but dropping on Monday) cannot be captured in histograms unless multiple intervals are dedicated for each period.

Conventional systems either accept large histograms resulting in slow query optimization, or have inaccurate selectivity estimation and thus unreliable selection among alternative query plans.

SUMMARY

Embodiments of a data processing system compress a histogram with less information loss than simply reducing the number of steps (or intervals) in the histogram. The data processing system uses a very detailed histogram as a starting point and comprises histogram compression logic that compresses a detailed histogram by detecting trends and periodic patterns in the detailed histogram. The histogram compression logic extracts the detected trends and periodic patterns from the detailed histogram, and forms a compressed histogram as a distribution of data remaining after extraction of the trends and periodic patterns.

BRIEF DESCRIPTION OF THE DRAWINGS

Embodiments of the invention relating to both structure and method of operation may best be understood by referring to the following description and accompanying drawings:

FIG. 4 is a schematic block diagram showing an embodiment of a computer-implemented system in the form of an article of manufacture that improves efficiency of processing by removing trends and patterns from histograms;

DETAILED DESCRIPTION

Data can be processed with improved efficiency by removing trends and patterns from histograms.

Histograms are used to describe data distributions, for example for use in database query optimization. Histogram compression is desirable in this use case, for example using "max-diff" heuristics wherein possible pairs of items within a set are evaluated and the pair reflecting the maximum difference in preference or importance is selected. A technique is disclosed herein in which trends and periodic patterns are extracted from the data distribution prior to histogram construction. The trend can be captured as a linear regression line or more complex polynomial or other function. A pattern can be described using frequency and shift, and amplitude and pattern (the latter pair perhaps as histogram or as function). A main histogram can be built for the distribution that is not captured by the trend or the periodic pattern. The original distribution can be estimated by combining the main histogram with the trend and pattern information.

The disclosed systems and techniques enable a data distribution to be summarized in a form useful to selectivity estimation during database query optimization (or other purposes) in a very compact and efficient, yet accurate, way.

Figure 1A:
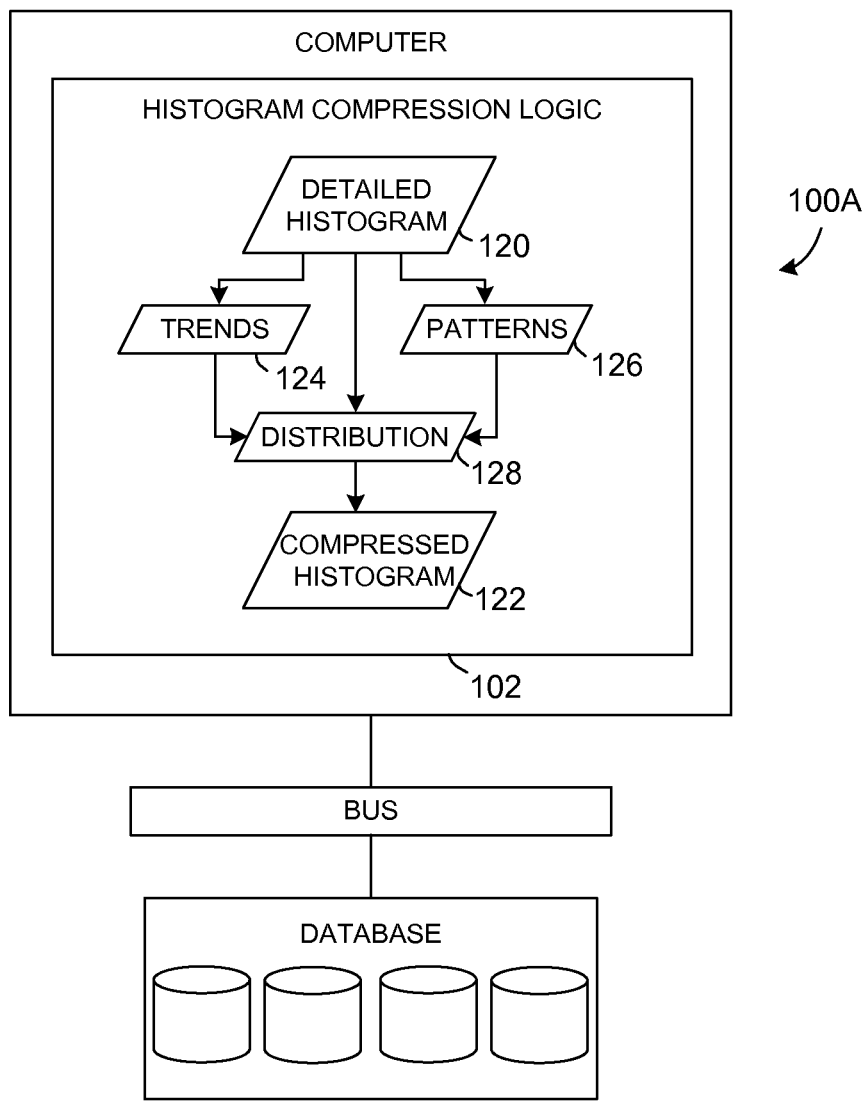
FIGS. 1A, 1B, 1C, and 1D are schematic block diagrams showing embodiments of data processing systems that improve efficiency of processing by removing trends and patterns from histograms.

Referring to FIG. 1A, a schematic block diagram illustrates an embodiment of a data processing system 100 that improves efficiency of processing by removing trends and patterns from histograms. The data processing system 100 comprises histogram processing logic 102 that extracts trends 124 and periodic pattern information 126 from a detailed histogram 120, captures a distribution 128 of data that remains after the trends 124 and periodic pattern information 126 are extracted, and constructs a compressed histogram 122 from the captured distribution 128.

Figure 1B:
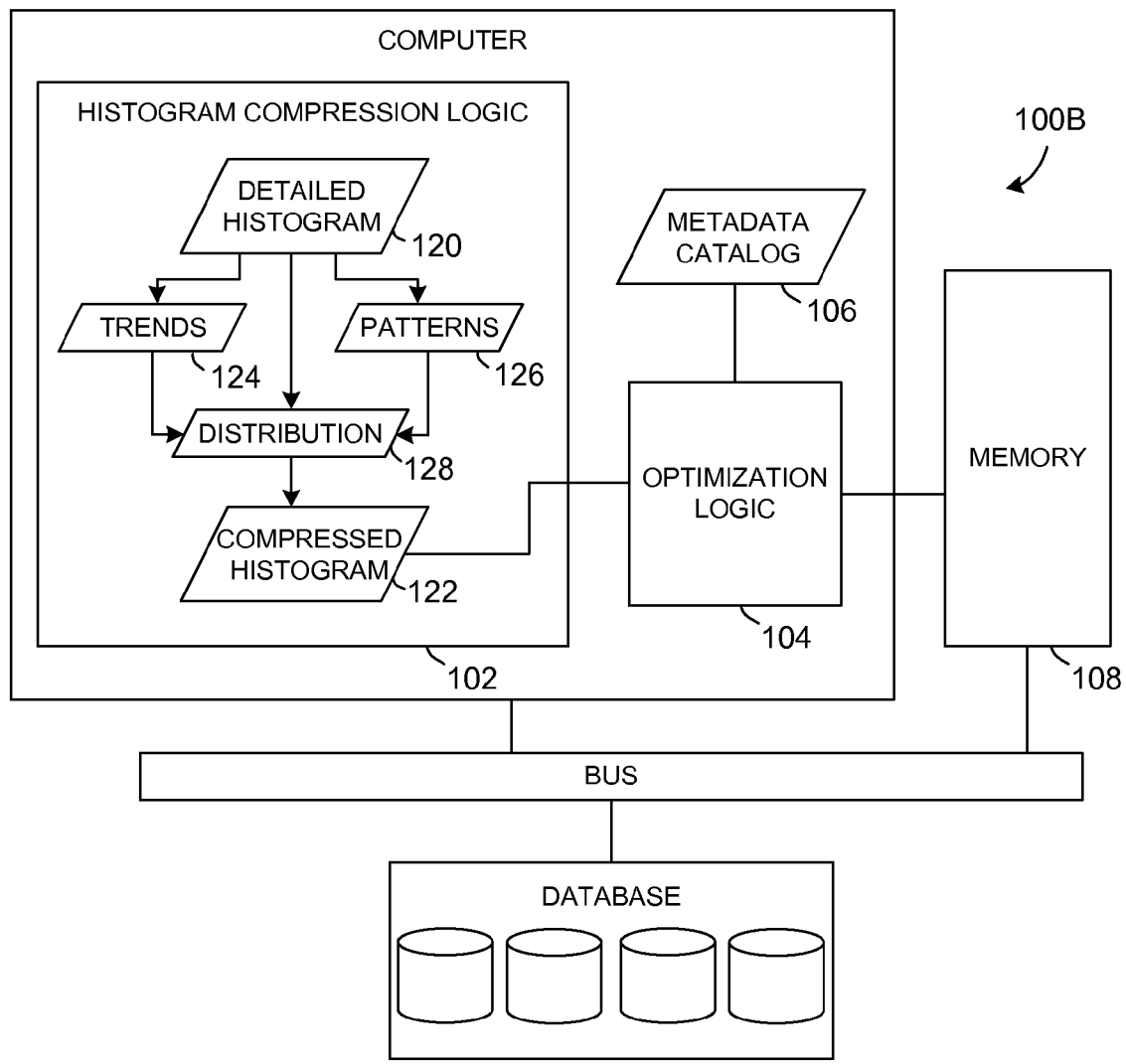

In some applications, for example as shown in FIG. 1B, the data processing system 100B can further comprise database query optimization logic 104 that performs cardinality estimation using the compressed histogram 122.

The database query optimization logic 104 can store the compressed histogram 122 in a database metadata catalog 106 and in memory 108 and efficiently accesses and manipulates data structures in the compressed histogram 122 during query optimization.

The removal of trends and patterns from histograms to improve processing efficiency may also be useful in applications beyond cardinality estimation during database query optimization.

The histogram processing logic 102 can use various techniques to form the compressed histogram 122. For example, the histogram processing logic 102 can use one or more of several techniques to approximate trends. Trends may be linear and thus approximated well with linear regressions, or may have a different shape. For other shapes, various non-linear techniques can be used to approximate the trends more appropriately using a higher-order polynomial, an exponential function, and the like.

Similarly, the histogram processing logic 102 can use one or more of several methods to detect periodic patterns. A pattern may be capture by a histogram (for example, average sales for each day of the week), a period function (for example, a sine function), a polynomial, and the like. Accordingly, the histogram processing logic 102 can detect periodic patterns using techniques such as histogram analysis, period function fitting, polynomial fitting, and others.

A histogram may be formed with intervals of equal width or some other configuration. Thus, the histogram processing logic 102 can operate upon a histogram allocated with intervals with equal width, and non-equal width.

The distribution within each histogram interval may be modeled as a uniform distribution (a horizontal bar at the top of the interval), by a slope or higher-order polynomial (splines), or by some other function or technique. Thus the histogram processing logic 102 can model histogram intervals according to a uniform distribution, slope, higher-order polynomial, or other form.

Figure 1C:
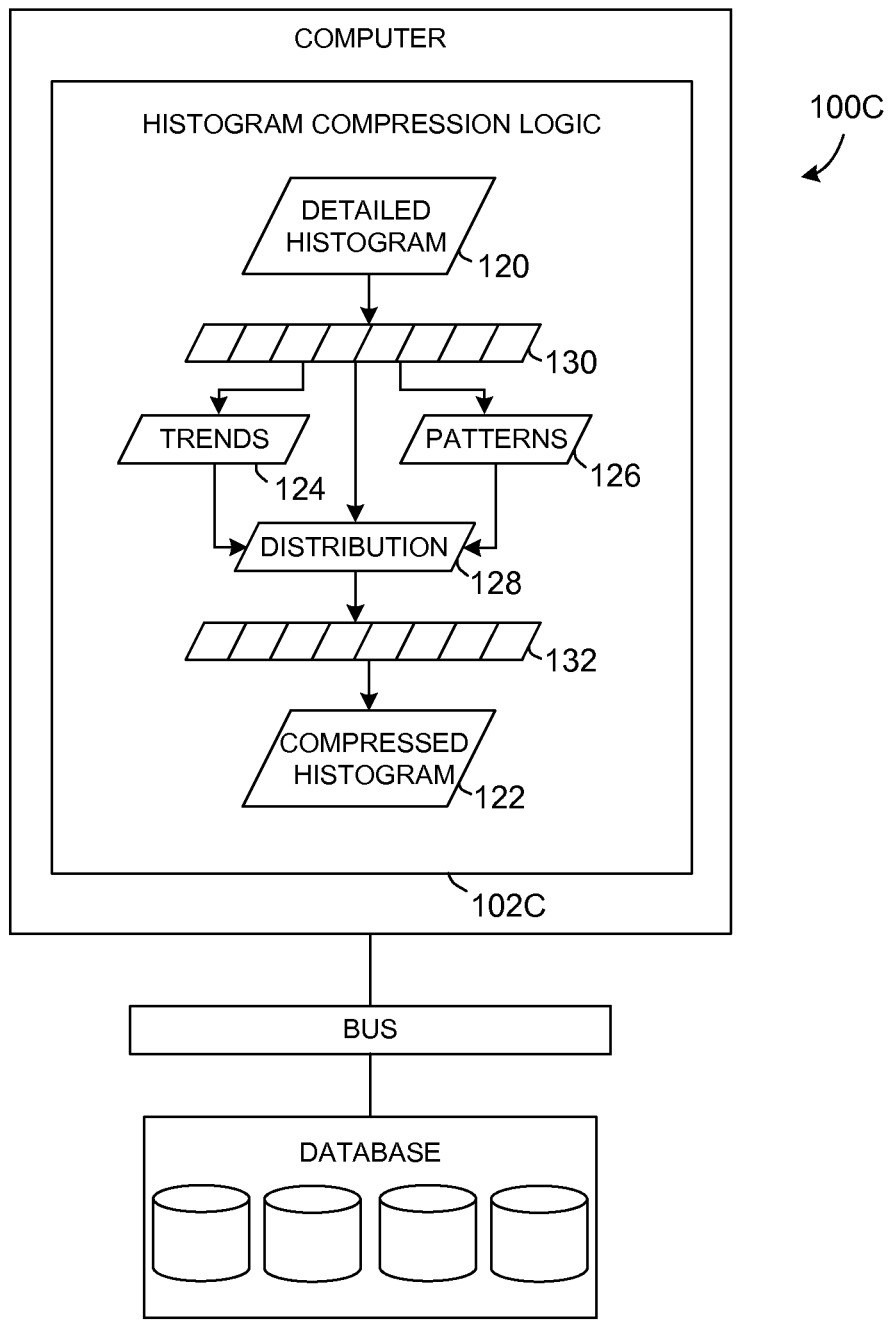

A trend or pattern may be present in only a part of the detailed histogram 120. A detailed histogram 120 can be divided into multiple segments, for example as shown in data processing system 100C in FIG. 1C, and different trends or patterns can be detected and extracted from the segments. Thus in some embodiments or for some applications, the histogram processing logic 102C can operate by dividing the detailed histogram 120 into a plurality of segments 130 and extracts trends 124 and/or periodic pattern information 126 of at least one detailed histogram segment 130 for construction of at least one compressed histogram segment 132. Segments selected with respect to trends and those with respect to patterns need not be the same.

Figure 1D:
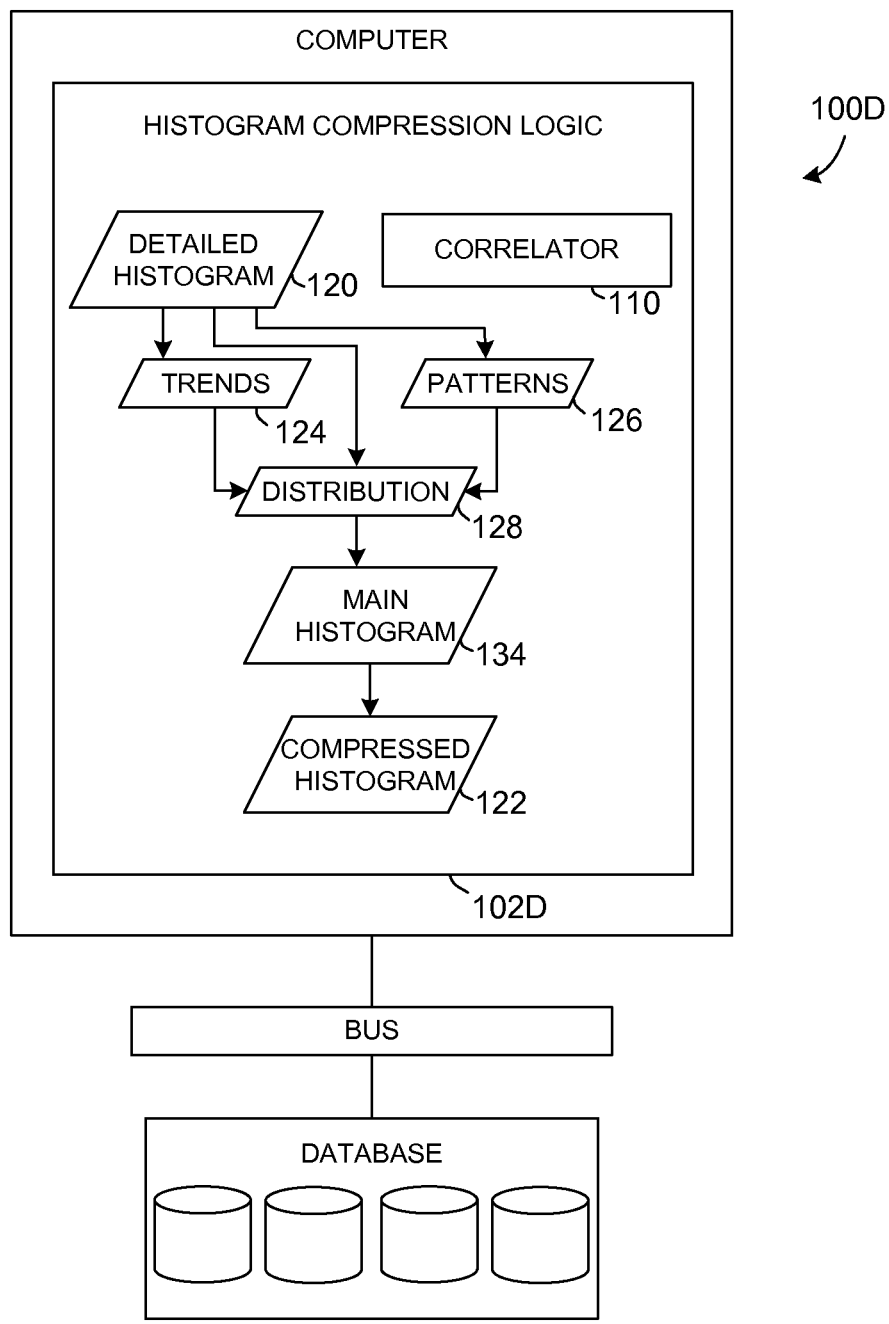

In an implementation of a data processing system 100D shown in FIG. 1D, the histogram processing logic 102D can capture trends by data regression, and can describe patterns in frequency, shift, and amplitude aspects of the data. The histogram processing logic 102D can build a main histogram 134 containing data distribution aspects that are not captured by the trend 124 and the periodic pattern 126, and then estimate an original distribution 128 of the data by combining the main histogram 134 with the extracted trend and pattern information.

The histogram processing logic 102D can include a correlator 110 that performs correlation analysis to determine whether the trends 124 and periodic pattern information 126 are sufficiently significant to warrant extraction from the histogram 120.

Figure 2:
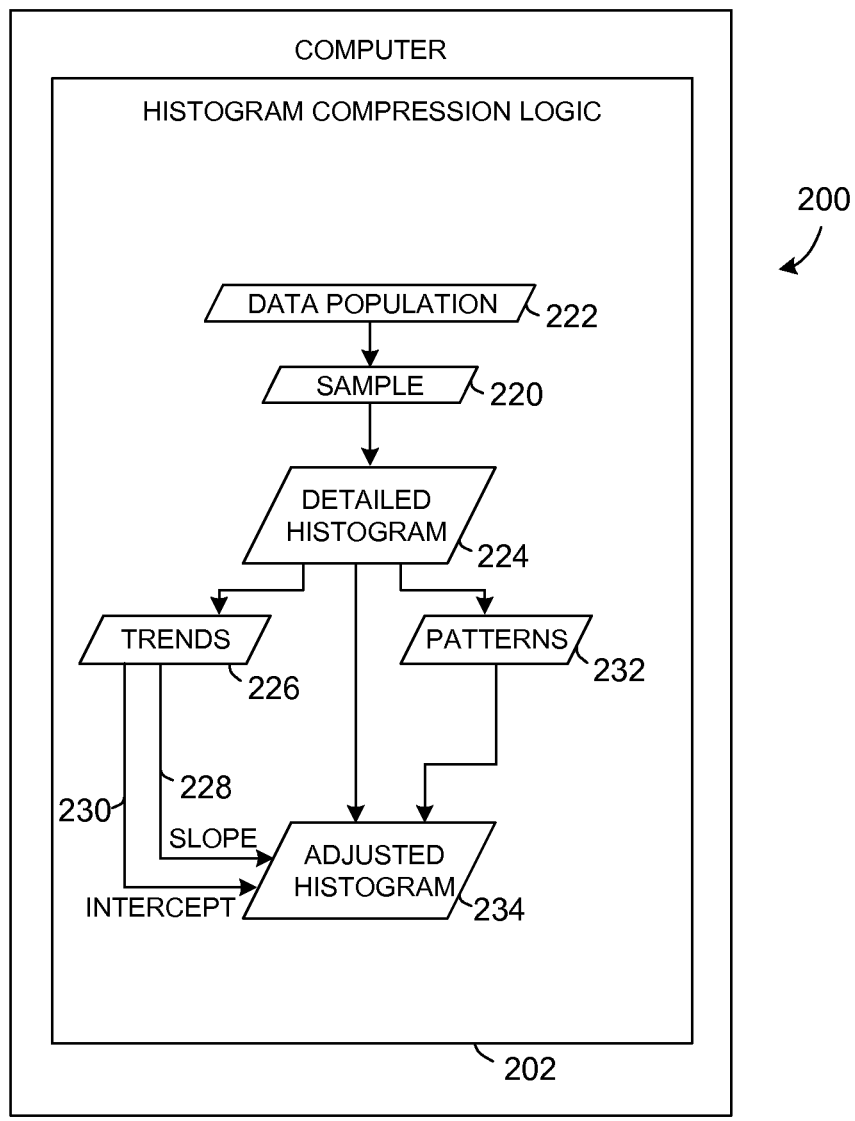
FIG. 2 is a schematic block diagram depicting another embodiment of a data processing system that improves processing efficiency.

Referring to FIG. 2, a schematic block diagram shows another embodiment of a data processing system 200 that improves processing efficiency. In a specific implementation, a histogram processing logic 202 can extract a sample 220 from a data population 222, derive a distribution function as a detailed histogram 224, and extract a trend line 226 with slope 228 and intercept 230 by linear regression. The histogram processing logic 202 analyzes the detailed histogram 224 for periodic patterns 232, and adjusts the histogram for the periodic patterns 232 so that counts in the adjusted histogram 234 are reduced by counts predicted by the periodic patterns 232. The data processing system 200 further comprises logic 204 that compresses the adjusted histogram 234. In some embodiments, the histogram processing logic 202 can segment the data population 222 and extract the sample 220 from the data population segment.

Figure 3:
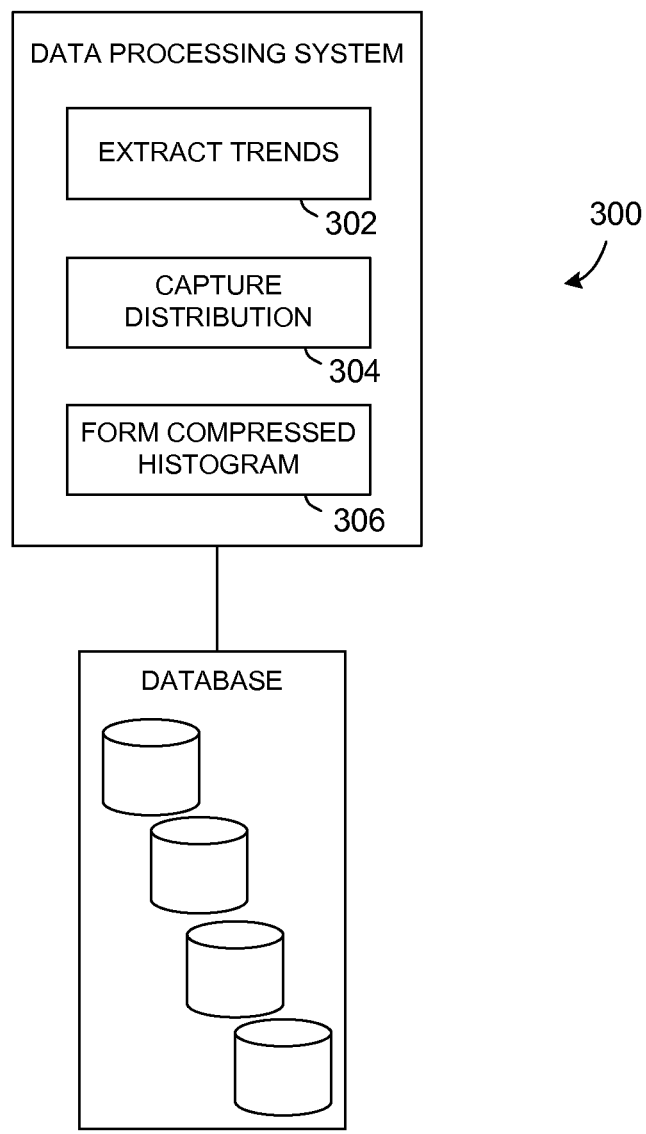
FIG. 3 is a schematic block diagram illustrating an embodiment of a computer-implemented data processing system that improves efficiency of processing by removing trends and patterns from histograms.

Referring to FIG. 3, a schematic block diagram illustrates an embodiment of a computer-implemented data processing system 300 that improves efficiency of processing by removing trends and patterns from histograms. The computer-implemented system 300 comprises means 302 for extracting trends and periodic pattern information from the detailed histogram, and means 304 for capturing the distribution of data that remains after the trends and periodic pattern information are extracted. The data processing system further comprises means 306 for constructing the compressed histogram from the captured distribution.

Referring to FIG. 4, a schematic block diagram illustrates an embodiment of a computer-implemented system 400 in the form of an article of manufacture 430 that improves efficiency of processing by removing trends and patterns from histograms. The article of manufacture 430 comprises a controller-usable medium 432 having a computer readable program code 434 embodied in a controller 436 for processing data 438. The computer readable program code 434 comprises code 402 causing the controller 436 to extract a sample from a data population, and code 404 causing the controller 436 to derive a distribution function as a detailed histogram. The computer readable program code 434 further comprises code 406 causing the controller 436 to extract a trend line with slope and intercept by linear regression, code 408 causing the controller 436 to analyze the detailed histogram for periodic patterns, and code 410 causing the controller 436 to adjust the histogram for the trends and periodic patterns wherein counts in the histogram are reduced by counts predicted by the periodic patterns.

Figures 5A, 5B:
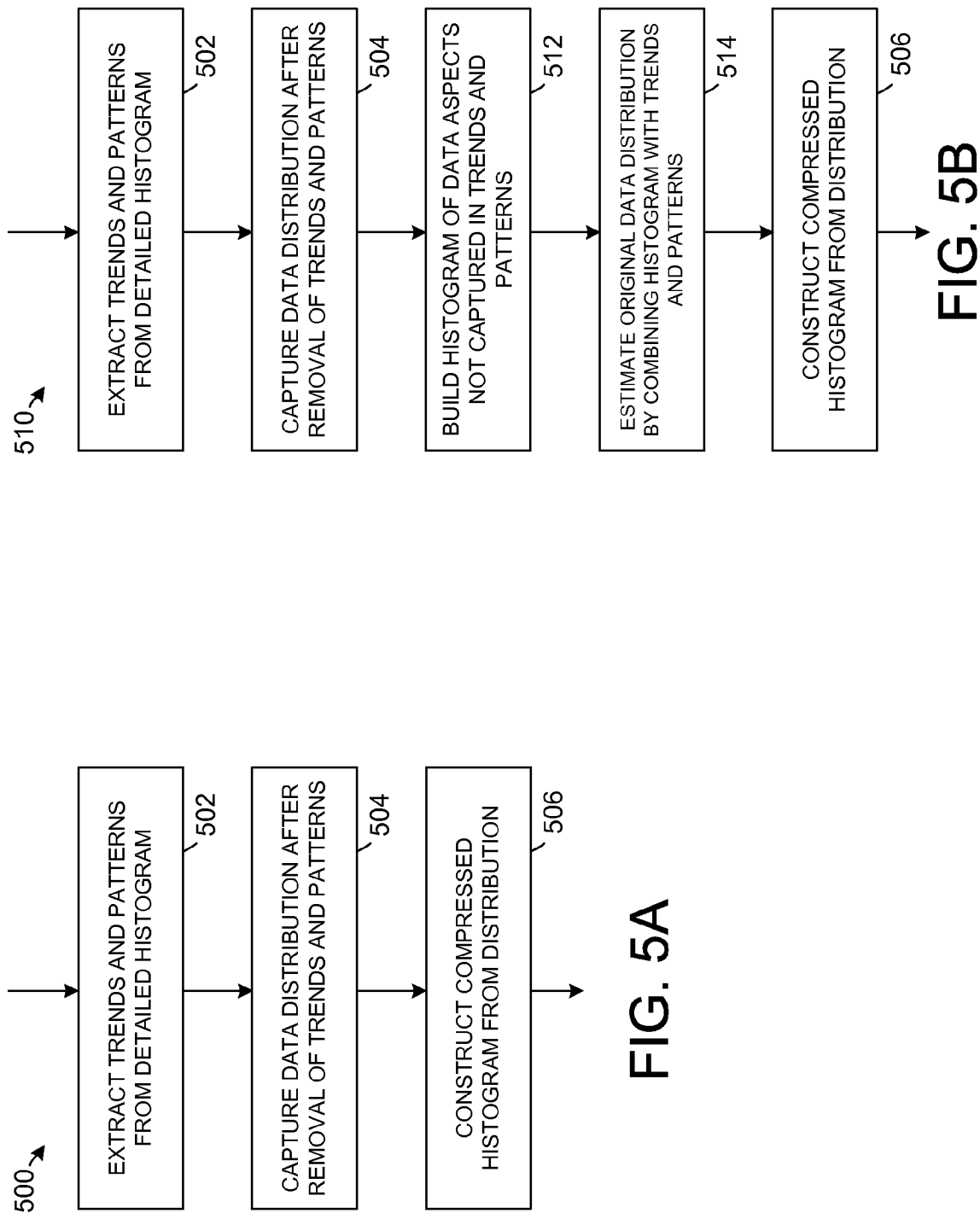
FIGS. 5A, 5B, and 5C are flow charts illustrating one or more embodiments or aspects of a computer-executed method for improving efficiency of processing by removing trends and patterns from histograms.
Figure 5C:
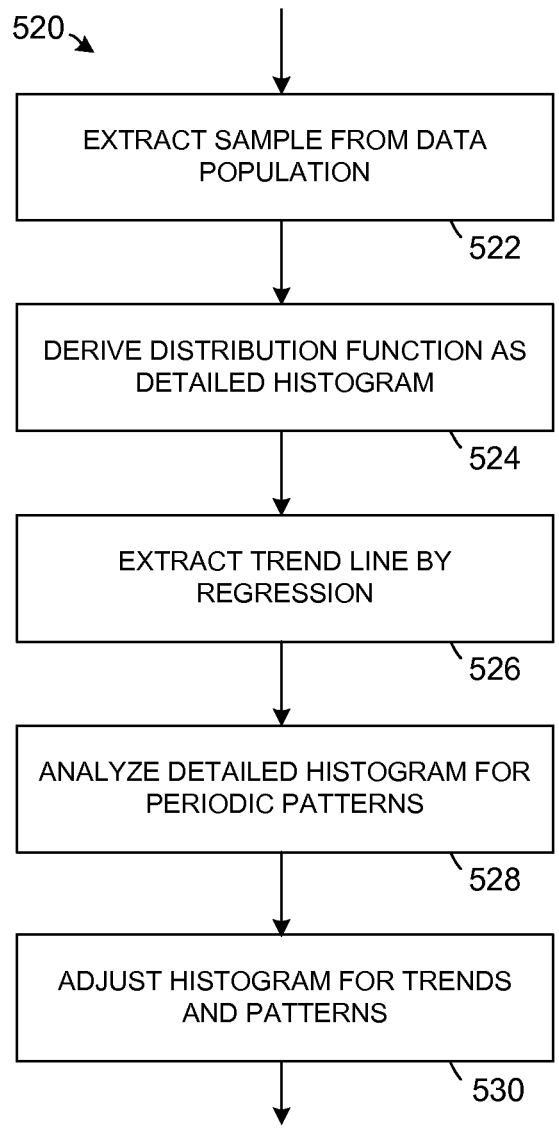

Referring to FIGS. 5A, 5B, and 5C, flow charts illustrate one or more embodiments or aspects of a computer-executed method for improving efficiency of processing by removing trends and patterns from histograms. FIG. 5A depicts an embodiment of a computer-executed method 500 for processing data comprising extracting 502 trends and periodic pattern information from a detailed histogram, and capturing 504 a distribution of data that remains after the trends and periodic pattern information are extracted. A compressed histogram is constructed 506 from the captured distribution.

Referring to FIG. 5B, a flow chart depicts an embodiment of a method 510 for improving efficiency of processing by removing trends and patterns from histograms can further comprise building 512 a main histogram for data distribution aspects not captured by the trend and the periodic pattern. An original distribution of the data can be estimated 514 by combining the main histogram with the extracted trend and pattern information.

Referring to FIG. 5C, a flow chart illustrates another method 520 for processing histogram data comprising extracting 522 a sample from a data population, deriving 524 a distribution function as a detailed histogram, and extracting 526 a trend line with slope and intercept by linear regression. The detailed histogram can be analyzed 528 for periodic patterns. The method 520 can further comprise adjusting 530 the histogram for the trends and periodic patterns so that counts in the histogram are reduced by counts predicted by the periodic patterns.

Figure 6:
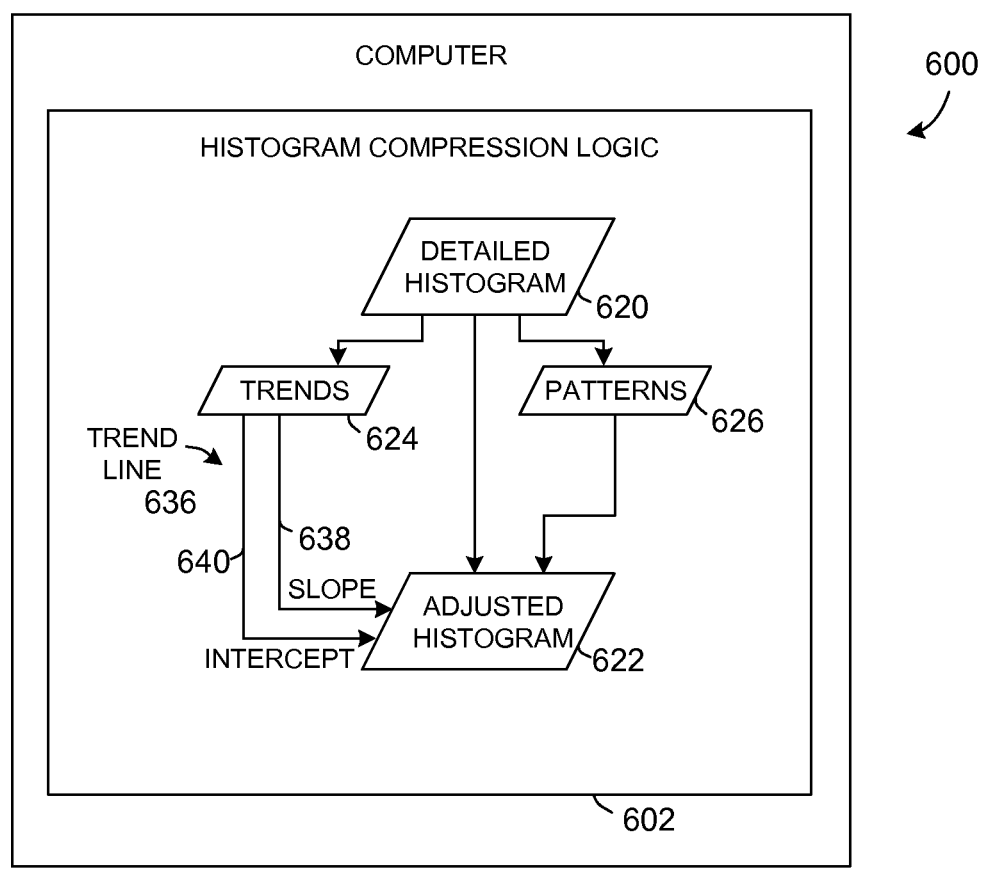
FIG. 6 is a schematic block diagram depicting an embodiment of a data processing system that compresses a histogram with limited loss of information.

Referring to FIG. 6, a schematic block diagram depicts an embodiment of a data processing system 600 that compresses a histogram with limited information loss. The data processing system 600 thus uses a very detailed histogram 620 as a starting point and comprises histogram compression logic 602 that compresses a detailed histogram 620 by detecting trends 624 and periodic patterns 626 in the detailed histogram 620, extracting the detected trends 624 and periodic patterns 626 from the detailed histogram 620, and forming a compressed histogram 622 as a distribution of data remaining after extraction of the trends 624 and periodic patterns 626.

The histogram compression logic 602 forms the compressed histogram 622 with reduced information loss in comparison to information loss of histogram compression techniques that reduce the number of intervals in a histogram.

The histogram compression logic 602 can extract a sample from a data population (for example, a 100% sample). A distribution function is derived in form of a very large and detailed histogram 620. Standard linear regression can be applied to extract a trend line 636 with slope 638 and intercept 640. All counts in the histogram 620 are reduced by the counts predicted by the regression line 636. The resulting histogram 622 is analyzed for periodic patterns, for example using autocorrelation, or periods are supplied (such as week, month, quarter, year).

Standard seasonal adjustment can be applied to extract a histogram 620 for each such period, and all counts in the histogram can be reduced by the counts predicted by the periodic pattern (if seasonal adjustment is performed—other methods of seasonal adjustment can also be employed). The remaining histogram 622 is free of a linear trend 624 and of the periodic patterns 626 which have been extracted and removed. Therefore, the remaining histogram 622 can be compressed more aggressively without loss of accuracy.

Variations of the disclosed technique can employ correlation analysis to determine whether the trend line 624 or the periodic patterns 626 are sufficiently strong to make removal worthwhile. Other variations apply the method above for segments of the entire distribution. Still other variations can employ polynomials of higher order than the linear trend. The variations can be combined as is appropriate for data.

Figure 7:
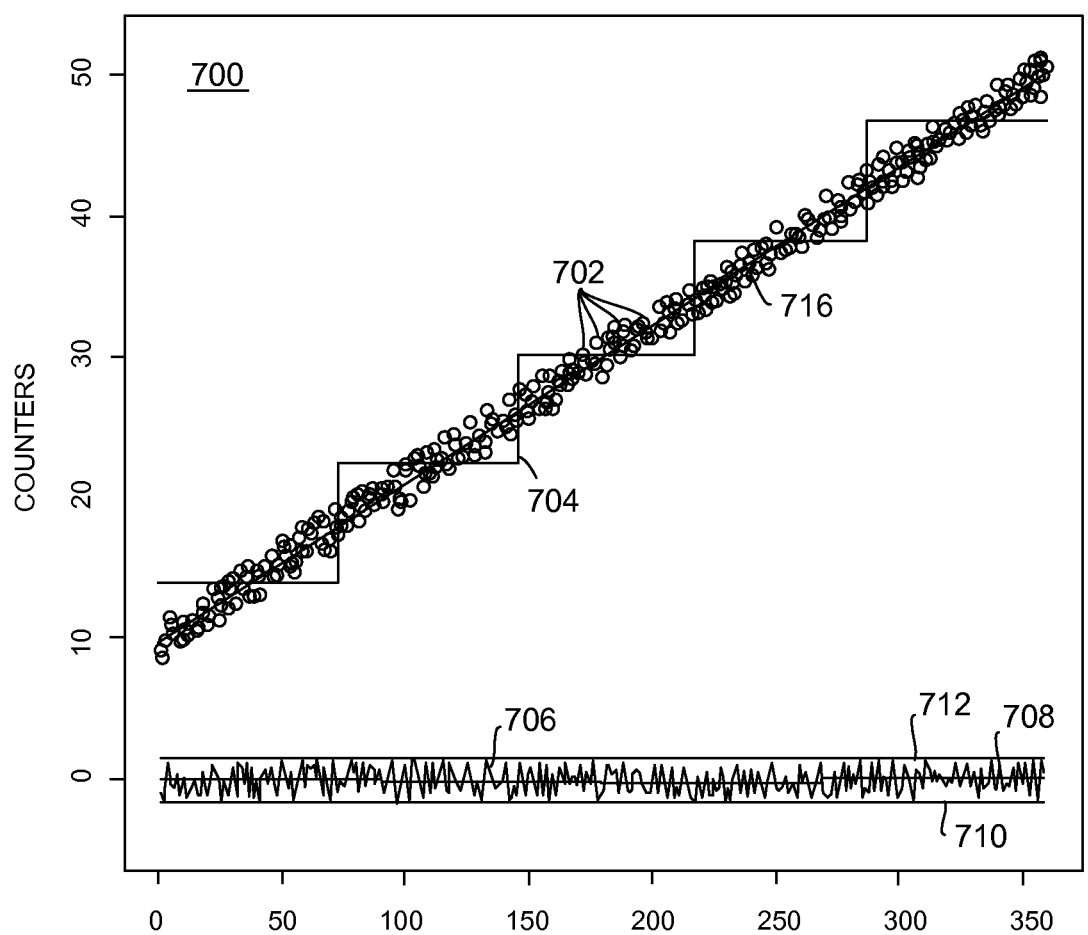
FIG. 7 is a diagram illustrating an example of operation of data processing system and associated method embodiments that improve efficiency of processing by removing trends and patterns from histograms.

Referring to FIG. 7, a diagram illustrates an example of operation of data processing system and associated method embodiments that improve efficiency of processing by removing trends and patterns from histograms. A graph 700 shows an assumed density distribution (y-axis) of a growing activity, for example daily sales, over a period of 360 days (x-axis). The daily values, illustrated as circles 702, show a steady growth pattern with only minor random fluctuations. A histogram 704, shown as a line of five steps, approximates the growth pattern only fairly roughly. In the illustrative example, the maximal vertical difference between an actual value (circle) and the corresponding value estimated with the histogram (steps) is 5.5.

The example histogram 704 has equal width steps. Other histogram configurations for interval boundaries can be used, but are not expected to produce improvements for the example data. Other suitable example histogram configurations include histograms with a spline approximation within each interval such as the simplest case of a polynomial spline—a linear approximation (slope). However, usage of slopes per interval is generally considered unwarranted over more simple approaches.

Approximation improves when linear regression is exploited. The irregular curve 706 shows the same values as the actual counts (circles 702) with the linear regression line 708 calculated and subtracted from all actual values. Minimum 710 and maximum values 712 are also shown as horizontal lines. A histogram 714 approximating the curve 706 appears almost as a constant line with value zero—only very minor steps can be discerned. When the regression line 708 is added to the histogram 714, the result appears almost as a straight line 716 through the center of the cloud of circles 702. The maximal vertical difference between an actual value and the corresponding value estimated by the combination of regression line and histogram is 1.6 is the example.

During database query optimization, this maximal vertical difference corresponds to the error in cardinality estimation for a single-day sales volume. By simple arithmetic using a well-known linear regression calculation, the maximal error is reduced by more than a factor of 3.

Figure 8:
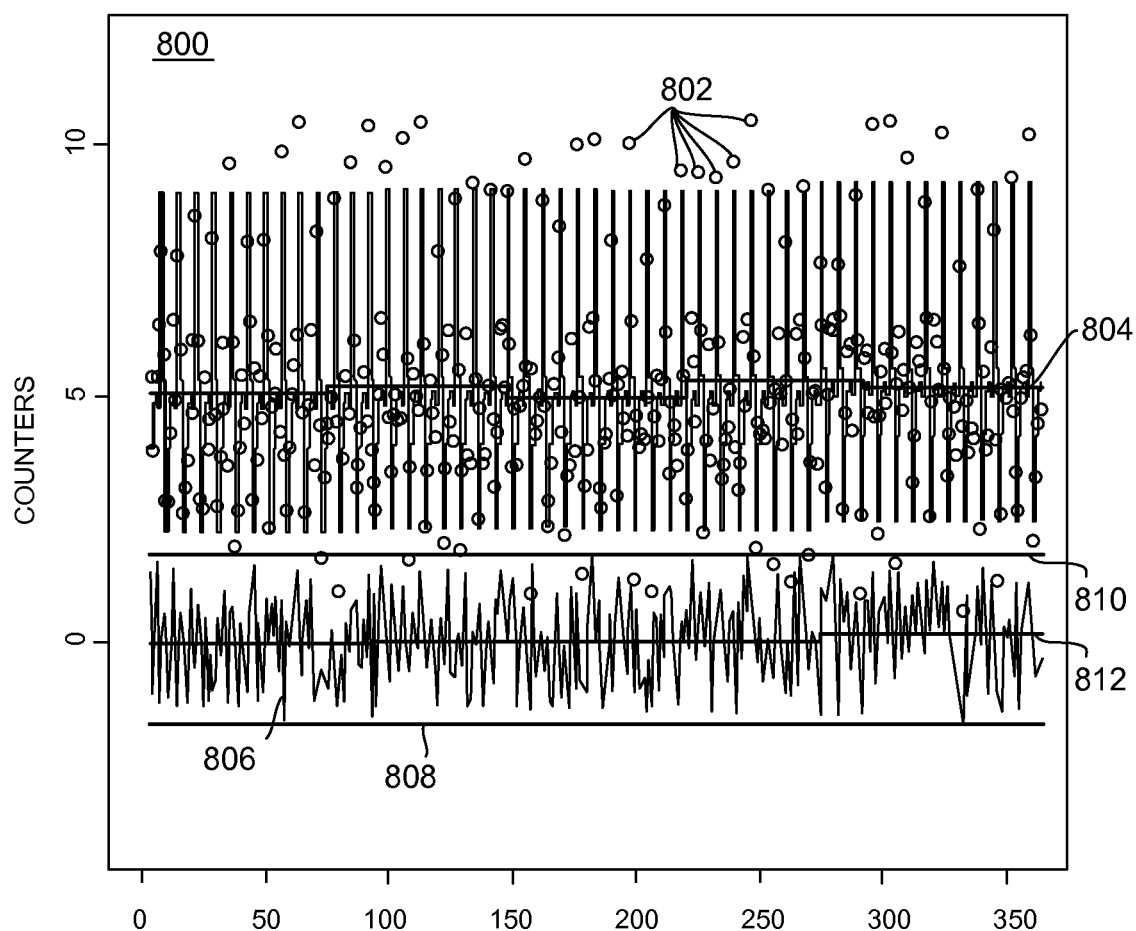
FIG. 8 is a diagram showing another example of operation of data processing system and associated method embodiments that improve efficiency of processing by removing trends and patterns from histograms.

Referring to FIG. 8, a diagram shows another example of operation of data processing system and associated method embodiments that improve efficiency of processing by removing trends and patterns from histograms. A graph 800 is an example showing a year of daily sales (360 values on the x axis) depicted using circles 802. A histogram 804 with 5 steps, shown as a line, indicates average daily sales of 5 units but conveys little additional information about the variability of the sales volumes. In fact, the maximal vertical difference between the histogram 804 and the actual values is 5.5, more than the average daily sales volume.

Assuming a weekly pattern, seven average values are computed and subtracted from the daily sales. The result is shown as line 806, with minimum 808 and maximum 810 values also indicated as lines in combination with a histogram 812. When the histogram 812 and the seven average values are combined, the sum approximates the actual daily sales quite well, with a maximal vertical difference of only about 1.8.

During database query optimization, the maximal vertical difference corresponds to the error in cardinality estimation for a single-day sales volume. By simple arithmetic equivalent to the well-known seasonal adjustment, the maximal error is reduced by more than a factor of 3.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:
1. A data processing system comprising:
hardware, including a processor; and
histogram processing logic implemented by the hardware and that extracts trends and periodic pattern information from a detailed histogram, captures a distribution of data that remains after the trends and periodic pattern infor- mation are extracted, and constructs a compressed histogram from the captured distribution, wherein extraction of trends and the periodic pattern information from the detailed histogram results in first data representing the trends and the periodic pattern information to be removed from the detailed histogram, wherein capture of the distribution of data that remains after the trends and periodic pattern information have been extracted from the detailed histogram results in capture of second data from the detailed histogram that remains after the first data has been removed from the detailed histogram, the second data representing the distribution of data that remains after the first data has been removed, the second data not including any of the first data, and wherein construction of the compressed histogram from the captured distribution results in generation of the compressed histogram based on the second data but not based on any of the first data.

2. The system according to claim 1 further comprising:
database query optimization logic that performs cardinality estimation using the compressed histogram.

3. The system according to claim 1 further comprising:
database query optimization logic that stores the compressed histogram in a database metadata catalog and in memory and efficiently accesses and manipulates data structures in the compressed histogram during query optimization.

4. The system according to claim 1 further comprising:
the histogram processing logic that divides the detailed histogram into a plurality of segments and extracts trends and/or periodic pattern information of at least one detailed histogram segment from the at least one detailed histogram segment for construction of at least one compressed histogram segment.

5. The system according to claim 1 further comprising:
the histogram processing logic that approximates trends according to regression selected from a group consisting of linear, non-linear, polynomial, and exponential;
the histogram processing logic that detects periodic patterns using a technique selected from a group consisting of histogram analysis, period function fitting, and polynomial fitting;
the histogram processing logic that operates upon a histogram allocated with intervals selected from a group consisting of equal-width, and non-equal-width; and
the histogram processing logic that models histogram intervals from a group consisting of uniform distribution, slope, and higher-order polynomial (splines).

6. The system according to claim 1 further comprising:
the histogram processing logic that captures trends by data regression, and describes patterns using frequency, shift, and amplitude aspects of the data; and
the histogram processing logic that builds a main histogram for data distribution aspects not captured by the trend and the periodic pattern, and estimates an original distribution of the data by combining the main histogram with the extracted trend and pattern information.

7. The system according to claim 1 further comprising:
the histogram processing logic that extracts a sample from a data population, derives a distribution function as a detailed histogram, extracts a trend line with slope and intercept by linear regression, analyzes the detailed histogram for periodic patterns, and adjusts the histogram for the periodic patterns wherein counts in the histogram are reduced by counts predicted by the periodic patterns;
logic that compresses the adjusted histogram; and
the histogram processing logic that segments the data population and extracts the sample from the data population segment.

8. The system according to claim 1 further comprising:
the histogram processing logic that performs correlation analysis to determine whether the trends and periodic pattern information are sufficiently significant to warrant extraction from the histogram.

9. The system according to claim 1 further comprising:
means for extracting trends and periodic pattern information from the detailed histogram;
means for capturing the distribution of data that remains after the trends and periodic pattern information are extracted; and
means for constructing the compressed histogram from the captured distribution.

10. The system according to claim 1 further comprising:
an article of manufacture comprising:
a controller-usable medium having a computer readable program code embodied in a controller for processing data, the computer readable program code further comprising:
code causing the controller to extract a sample from a data population;
code causing the controller to derive a distribution function as a detailed histogram;
code causing the controller to extract a trend line with slope and intercept by linear regression;
code causing the controller to analyze the detailed histogram for periodic patterns; and
code causing the controller to adjust the histogram for the periodic patterns wherein counts in the histogram are reduced by counts predicted by the periodic patterns.

11. A method for processing data comprising:
extracting trends and periodic pattern information from a detailed histogram;
capturing a distribution of data that remains after trends and periodic pattern information are extracted; and
constructing by the computing device, a compressed histogram from the captured distribution,
wherein extraction of the trends and the periodic pattern information from the detailed histogram results in first data representing the trends and the periodic pattern information to be removed from the detailed histogram,
wherein capture of the distribution of data remains after the trends and periodic pattern information have been extracted from the detailed histogram results in capture of second data from the detailed histogram that remains after the first data has been removed from the detailed histogram, the second data representing the distribution of data that remains after the first data has been removed, the second data not including any of the first data,
and wherein construction of the compressed histogram from the captured distribution results in generation of the compressed histogram based on the second data but not based on any of the first data.

12. The method according to claim 11 further comprising:
building a main histogram for data distribution aspects not captured by the trend and the periodic pattern; and
estimating an original distribution of the data by combining the main histogram with the extracted trend and pattern information.

13. The method according to claim 11 further comprising:
extracting a sample from a data population;
deriving a distribution function as a detailed histogram;

extracting a trend line with slope and intercept by linear regression;

analyzing the detailed histogram for periodic patterns; and adjusting the histogram for the periodic patterns wherein counts in the histogram are reduced by counts predicted by the periodic patterns.

14. A non-transitory computer-readable data storage medium storing instructions executable by a processor, the storage medium comprising:

instructions to compress a detailed histogram comprising detecting trends and periodic patterns in the detailed histogram;

instructions to extract the detected trends and periodic patterns from the detailed histogram; and instructions to form a compressed histogram as a distribution of data remaining after extraction of the trends and periodic patterns, wherein extraction of the trends and the periodic pattern information from the detailed histogram results in first data representing the trends and the periodic pattern information to be removed from the detailed histogram, wherein capture of the distribution of data that remains after the trends and periodic pattern information have been extracted from the detailed histogram results in capture of second data from the detailed histogram that remains after the first data has been removed from the detailed histogram, the second data representing the distribution of data that remains after the first data has been removed, the second data not including any of the first data, and wherein construction of the compressed histogram from the captured distribution results in generation of the compressed histogram based on the second data but not based on any of the first data.

15. The non-transitory computer-readable data storage medium, according to claim 14, further comprising instructions to form the compressed histogram with reduced information loss in comparison to information loss of histogram compression techniques that reduce the number of intervals in a histogram.

* * * * *

UNITED STATES PATENT AND TRADEMARK OFFICE
CERTIFICATE OF CORRECTION

| | | |
|---|---|---|
| PATENT NO. | : 8,768,938 B2 | Page 1 of 1 |
| APPLICATION NO. | : 12/491965 | |
| DATED | : July 1, 2014 | |
| INVENTOR(S) | : Graefe | |

It is certified that error appears in the above-identified patent and that said Letters Patent is hereby corrected as shown below:

In the Claims

Column 7, line 3, Claim 1, delete "of" and insert -- of the --, therefor.

Column 8, line 37, Claim 11, delete "extracting" and insert -- extracting, by a computing device, --, therefor.

Column 8, line 39, Claim 11, delete "capturing" and insert -- capturing, by the computing device, --, therefor.

Column 8, line 41, Claim 11, delete "constructing" and insert -- constructing, --, therefor.

Column 8, line 47, Claim 11, after "data" insert -- that --.

Column 10, line 15, Claim 15, delete "medium," and insert -- medium --, therefor.

Signed and Sealed this
Eleventh Day of November, 2014

Michelle K. Lee
*Deputy Director of the United States Patent and Trademark Office*